Patented Apr. 19, 1949

2,467,527

UNITED STATES PATENT OFFICE 2,467,527

ACCELERATION OF THE CURE OF COPOLYMERS

Raymond R. Harris, Stamford, Conn., assignor to American Cyanamid Company, New York, N. Y., a corporation of Maine No Drawing. Application October 10, 1944, Serial No. 558,087

4 Claims. (Cl. 260—45.4)

This invention relates to the activation of catalysts for the copolymerization of an unsaturated alkyd resin with a compound containing the $$CH_2=C\diagup_\diagdown$$

group.

An object of this invention is to increase the speed of the copolymerization reaction between an unsaturated alkyd resin and a substance containing the $$CH_2=C\diagup_\diagdown$$

group such as for example styrene.

Another object of this invention is to provide fast-setting casting resins.

These, and other objects, are attained by copolymerizing an unsaturated alkyd resin with a substance containing a $$CH_2=C\diagup_\diagdown$$

group in the presence of an organic peroxide and a stannous salt such as, for example, stannous chloride. It is preferable that the weight ratio of the peroxide to the stannous salt chloride be between about 25:1 and 2:1 (based on Sn). It has been found that the proportion of peroxide may be varied over relatively wide ranges e. g., from about 0.1% to about 5%. In many applications large amounts of peroxide are undesirable either because of the very high speed of reaction or because of the effect on the final product. It is therefore preferable for most purposes that the proportion of peroxide be between about 0.1% and 0.5%.

The following examples in which the proportions are in parts by weight are given by way of an illustration and not in limitation.

Example 1

1 part of styrene and 2 parts of an unsaturated alkyd resin (a polyester of 6 mols of diethylene glycol, 5 mols of fumaric acid and 1 mol of sebacic acid) are mixed together to form a homogeneous composition and to different portions of this composition substances are added, the resulting mixtures are cast and cured at 25° C. The following table shows the results obtained both with and without added substances. The tin is added in the form of a solution of $SnCl_2.2H_2O$.

| Casting No. | Per Cent Lauric Peroxide | Per Cent Sn | Inhibitor | Per Cent Inhibitor | Time of Cure, Hours |
|---|---|---|---|---|---|
| 1 | 0.3 | 0 | | 0 | 10 |
| 2 | 0.3 | 0.02 | | 0 | 1 |
| 3 | 0.5 | 0 | "A" | 0.03 | 50 |
| 4 | 0.5 | 0.03 | "A" | 0.03 | 1½ |
| 5 | 0.5 | 0 | "B" | 0.01 | 150 |
| 6 | 0.5 | 0.05 | "B" | 0.01 | 1½ |

Inhibitor "A" is the monobenzyl ether of hydroquinone.
Inhibitor "B" is hydroquinone.

When 0.5% of lauric peroxide is added to the same mixture of styrene and unsaturated alkyd resin used, and when about from 0.022% to 0.45% of tin (as stannic chloride in dioxane) is added the resulting compositions do not gel in 24 hours. Then it is apparent that the tin must be in the stannous form.

Example 2

About 1 part of styrene and 2 parts of a compatible unsaturated alkyd resin (a diethylene glycol fumarate modified with sebacic acid as described in Example 1) are mixed together with 0.01% of hydroquinone to form a homogeneous mixture and 0.5% of lauric peroxide together with 0.052% of Sn as stannous chloride is incorporated in the mixture. This mixture after casting, gels in about 20 minutes at a temperature of about 25° C. and sets to a hard product after about 40 minutes.

Example 3

Example 2 is repeated except that 2.6% of lauric peroxide is employed together with 0.26% of Sn as stannous chloride. The polymerizable mixture produced according to this example, gels in 8 minutes after casting at 25° C. and cures in about 12 minutes.

Example 4

About 1 part of methyl methacrylate and 2 parts of an unsaturated alkyd resin (a diethylene glycol fumarate modified with sebacic acid as described in Example 1) etc., mixed together with 0.01% of hydroquinone to form a homogeneous mixture and 0.5% of lauric peroxide together with 0.052% of Sn as stannous chloride is incorporated in the mixture. This mixture, after casting, gels in about 25 minutes at 25° C. and sets to a hard product in about 70 minutes at the same temperature.

If the preceding procedure is carried out omitting the stannous salt from the mixture the mixture fails to set after standing 12–15 hours at 25° C.

Example 5

About 1 part of vinyl acetate and 2 parts of an unsaturated alkyd resin (as described in Example 1) are mixed together to form a homogeneous mixture. 0.5% of lauric peroxide and 0.026% of Sn as stannous chloride is incorporated in the mixture. This mixture, after casting, gels in about 15 minutes and sets to a hard product in about 60 minutes at a temperature of about 25° C.

It will be apparent from a consideration of my examples that I am able to obtain a fast curing product which may be cast at ordinary room temperatures and I may employ temperatures of about 20–30° C. with similar results. Previously it has been customary to employ much higher temperatures for curing resins of the type employed herein in order to obtain cured products quickly. My invention therefore makes it possible to produce castings or other articles without the use of expensive ovens or other means of supplying heat to the polymerizing compositions while they are being cured.

Any stannous salt may be used in place of stannous chloride, e. g., the nitrate, sulfate oxalate, etc. The stannous salts are conveniently introduced into the polymerizable mixtures in the form of solutions in organic solvents such as ethylene glycol, diethylene glycol, dioxane, acetone etc. The hydrates of the salts may be used such as $SnCl_2.2H_2O$.

My invention is particularly adapted for use in the production of castings but it may also be used in the production of laminated materials, moldings, etc. One advantageous application of my invention is in the use of my resin mixtures containing a stannous salt to impregnate cloth to be used in laminating. The tin causes the resin to gel and the impregnated cloth may then be drawn in forming a laminate in a complex shape. After the laminate is formed the resin is fully cured by heating at elevated temperatures of 70–110° C.

Coatings of my resinous mixtures may be gelled by means of the stannous salt so that pressure and heat may be applied to cure the resinous coating and the latter does not squeeze out but has sufficient body that a film of substantial thickness remains in place.

The use of low temperatures for the curing of copolymerizable mixtures of unsaturated alkyd resins and substances containing the

group results in the production of flawless products. In many cases particularly in the production of castings high temperatures result in cracking or blistering. My invention overcomes this difficulty, and, accordingly, large castings or thick laminates may be produced satisfactory.

Examples of substances containing a polymerizably reactive

group which may be copolymerized with an unsaturated alkyd resin in accordance with my invention are styrene, p-methylstyrene and the ortho- and meta-isomers thereof, the monochlorstyrenes, any of the dimethylstyrenes, any of the dichlorstyrenes, vinyl acetate, esters of methacrylic and acrylic acids such as methyl methacrylate, methyl acrylate, ethyl acrylate, the allyl esters such as for example diallyl phthalate, diallyl fumarate, diallyl maleate, diallyl sebacate, diallyl succinate, triallyl phosphate, triallyl tricarballyate, the diallyl ester of ammelide, etc. The polyallyl esters are especially suitable for copolymerization with unsaturated alkyd resins but other allyl compounds may be employed, such as diallyl ether.

The substances containing the

group which are particularly useful in accordance with my invention are those which have a boiling point of at least 60° C. and are therefore normally liquid. Furthermore, these substances do not contain conjugated carbon-to-carbon double bonds since such compounds are known to react with themselves, or with other unsaturated compounds such as the maleic esters by a 1,2–1,4 addition mechanism such as that which has become generally known as the Diels-Alder reaction. On the other hand compounds such as those used in accordance with the present invention and which contain no conjugated carbon-to-carbon double bonds obviously cannot undergo this type of reaction with the maleic esters. Accordingly, my invention is not directed to the use of unsaturated compounds containing conjugated systems of carbon-to-carbon double bonds. Many substances which contain carbon-to-carbon double bonds conjugated with respect to oxygen are suitable for use according to this invention since they do not react with unsaturated alkyd resins in an undesirable manner but instead copolymerize or interpolymerize to form substantially insoluble resins.

The unsaturated alkyd resins which are suitable for use in accordance with my invention are those which are polyesters of an alpha, beta unsaturated polycarboxylic acid and a polyhydric alcohol. The unsaturated alkyd resins may be modified with monohydric alcohols or monocarboxylic acids. However, the proportions of the various substances esterified to form the resin are such that the polyester is formed from substances having a total of about one hydroxyl group for each carboxyl group.

Among the alpha, beta unsaturated polycarboxylic acids which may be used some examples are maleic acid, fumaric acid, itaconic acid, citraconic acid, etc. Mixtures of alpha, beta polycarboxylic acids may be used, and mixtures of polycarboxylic acids including one or more alpha, beta unsaturated polycarboxylic acids and a saturated aliphatic polycarboxylic acid or an aromatic polycarboxylic acid may be employed. In some cases, particularly when the unsaturated alkyd resin is to be used for copolymerization with styrene or other aromatic vinyl hydrocarbons it is desirable that the unsaturated alkyd resin contain a small proportion of a relatively long chain polycarboxylic acid such as adipic acid or sebacic acid, or of an aromatic polycarboxylic acid such as phthalic acid or endomethylene tetrahydrophthalic anhydride.

The term "acid" as used herein, is intended to cover the anhydride as well as the acid since the anhydride may be used whenever available and desirable.

The unsaturated alkyd resins are preferably polyesters of glycols, but other polyhydric alcohols, including glycerine, pentaerythritol, dipentaerythritol, polyallyl alcohol etc., may be used. Examples of glycols which may be employed are ethylene glycol, diethylene glycol, trimethylene glycol, alpha-propylene glycol, any of the butylene glycols, decamethylene glycol, octadecandiol etc.

Among the monocarboxylic acids which may be employed as modifiers some examples are acetic acid, cuproic acid, lauric acid, myristic acid, stearic acid, oleic acid, linoleic acid, linolenic acid, etc. Some examples of the monohydric alcohols which may be used as modifiers are n-butanol, propanol, isopropanol, the amyl alcohols, cyclohexanol, 2-ethyl hexanol, dodecanol, cetyl alcohol, octadecanol, benzyl alcohol, furfuryl alcohol and tetrahydroabietyl alcohol, etc.

When glycols are reacted with a dicarboxylic acid it is preferable that the glycol be present in a molal ratio to the acid of not less than 1:2 and the molal ratio of monohydric alcohol to dicarboxylic acid not greater than 1:1. In most cases the molal ratio of monohydric alcohol to dicarboxylic acid of about 1:6 produces the best results (5.5 mols of glycol being employed in this case). The proportion of monocarboxylic acid which may be used should similarly be less than 1:2 in most instances. If a dicarboxylic acid which does not contain an alpha, beta unsaturation is used to modify the unsaturated alkyd resins it is preferable that the molal ratio thereof to the alpha, beta unsaturated polycarboxylic acid be less than about 1:2 and preferable that the ratio be about 1:5.

The unsaturated alkyd resins are produced in accordance with technique well known in the alkyd resin art. The final product should preferably have an acid number not greater than 50, although in some cases resins having an acid number as high as 100 may be desirable.

Among the organic peroxides which may be employed as catalysts in accordance with the present invention in conjunction with the stannous salts, some examples are: benzoyl peroxide, phthalic peroxide, succinic peroxide and benzoyl acetic peroxide, fatty oil acid peroxides, e. g., coconut oil acid peroxides, lauric peroxide, stearic peroxide and oleic peroxide, alcohol peroxides, e. g., tertiary butyl hydroperoxide usually called tertiary butyl peroxide and terpene oxides. The accelerative effect of the stannous salt is more pronounced with the oil acid peroxides and with benzoyl acetic peroxide.

Moldings or castings produced in accordance with my invention may have any suitable filler, dye or pigment incorporated therein, including for example alpha cellulose pulp, wood flour, glass fibers, asbestos fibers, titanium oxide, etc. Laminated materials may be prepared utilizing the resins disclosed herein and catalyzed by my method, and such laminated materials may contain paper or fabric composed of cellulose fibers, glass fibers, asbestos fibers, synthetic fibers, etc.

In my copending application Serial No. 558,086, filed Oct. 10, 1944 entitled "Curing of copolymers" I have described and claimed the use of polyvalent metals in their reduced form for the same purpose as the stannous salts used herein. Metals other than tin usually possess some one or more of the following disadvantages not experienced with tin: (1) they are less active, (2) they discolor the product, (3) they are not readily soluble in solvents which are compatible with the copolymerizable mixture of unsaturated alkyd resins and compounds containing the

group and (4) they are more expensive.

Obviously many modifications and changes may be made in the compositions and processes described herein without departing from the spirit and scope of the invention as defined in the appended claims.

I claim:

1. A process which comprises polymerizing in bulk a homogeneous mixture including an unsaturated alkyd resin which is a polyester of a mixture containing a polyhydric alcohol and an alpha, beta-unsaturated polycarboxylic acid, together with a polymerizable liquid substance containing the

group, said liquid substance containing no carbon-to-carbon conjugation and having a boiling point of at least 60° C., about 0.1 – 5% of an organic peroxide catalyst and a stannous salt, the weight ratio thereof to the peroxide being between 1:25 and 1:2, based on Sn, said stannous salt being the sole activator of said peroxide catalyst present in said homogeneous mixture.

2. A process as in claim 1 wherein the stannous salt is stannous chloride.

3. A process as in claim 1 wherein the stannous salt is stannous chloride, and wherein the temperature of polymerization is about 20 – 30° C.

4. A process as in claim 1 wherein the polymerizable liquid substance is styrene.

RAYMOND R. HARRIS.

REFERENCES CITED

The following references are of record in the file of this patent:

UNITED STATES PATENTS

| Number | Name | Date |
|---|---|---|
| 2,171,765 | Rohm et al. | Sept. 5, 1939 |
| 2,344,785 | Owens et al. | Mar. 21, 1944 |
| 2,370,010 | Clifford et al. | Feb. 20, 1945 |
| 2,416,461 | Stewart | Feb. 25, 1947 |

OTHER REFERENCES

Bacon, p. 140, 146 and 147, Transactions of the Faraday Society, March – April 1946.

Kropa et al., p. 1512–1516, Ind. & Eng. Chem., Dec. 1939.